US009221302B2

(12) United States Patent
Okabayashi

(10) Patent No.: US 9,221,302 B2
(45) Date of Patent: Dec. 29, 2015

(54) PNEUMATIC TIRE

(75) Inventor: Sawa Okabayashi, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 883 days.

(21) Appl. No.: 13/460,092

(22) Filed: Apr. 30, 2012

(65) Prior Publication Data

US 2012/0285594 A1 Nov. 15, 2012

(30) Foreign Application Priority Data

May 12, 2011 (JP) ................................. 2011-107468

(51) Int. Cl.
*B60C 11/03* (2006.01)
*B60C 11/13* (2006.01)
*B60C 11/12* (2006.01)

(52) U.S. Cl.
CPC ......... *B60C 11/0302* (2013.04); *B60C 11/1204* (2013.04); *B60C 11/0306* (2013.04); *B60C 11/1369* (2013.04); *B60C 2011/0353* (2013.04); *B60C 2011/0365* (2013.04); *B60C 2011/0372* (2013.04); *B60C 2011/1213* (2013.04)

(58) Field of Classification Search
CPC .................. B60C 11/0302; B60C 2011/0381; B60C 2011/0358; B60C 2011/0365; B60C 2011/0372; B60C 2011/0374; B60C 11/032; B60C 11/01; B60C 11/03; B60C 11/0306; B60C 11/0309; B60C 2011/0339; B60C 2011/0341; B60C 2011/0346; B60C 2011/0376; B60C 2011/0383; B60C 11/11; B60C 11/13

USPC ......... 152/209.1, 209.9, 209.16, 209.28, 902, 152/903, 209.18

See application file for complete search history.

(56) References Cited

U.S. PATENT DOCUMENTS

| 4,667,717 | A | * | 5/1987 | Graas ........................ 152/209.18 |
| 5,353,854 | A | * | 10/1994 | Landers et al. .......... 152/209.15 |
| 5,358,022 | A | * | 10/1994 | Glover et al. ............. 152/209.22 |
| 8,985,170 | B2 | * | 3/2015 | Kaba .......................... 152/209.8 |
| 2003/0019555 | A1 | | 1/2003 | Nakagawa | |

FOREIGN PATENT DOCUMENTS

EP 2230100 * 9/2010

* cited by examiner

*Primary Examiner* — Eric Hug
(74) *Attorney, Agent, or Firm* — Birch Stewart Kolasch & Birch, LLP

(57) ABSTRACT

A pneumatic tire has a unidirectional tread pattern. On each side of the tire equator, there are a circumferential groove and main oblique grooves extending form the tread edge to the circumferential groove while inclining to the intended tire rotational direction and gradually decreasing its inclination angle with respect to the tire circumferential direction. The inclination angle of the main oblique groove measured at the tread edge is 60 to 120 degrees. The width of the main oblique groove is gradually increased toward the axially outside from the circumferential groove. The width of the circumferential groove becomes narrower at heel-side ends of shoulder blocks than at toe-side ends of the shoulder blocks. The shoulder block is provided with an auxiliary oblique groove extending from the main oblique groove toward the intended tire rotational direction and terminating without reaching to the next main oblique groove.

13 Claims, 3 Drawing Sheets

PNEUMATIC TIRE

BACKGROUND OF THE INVENTION

The present invention relates to a pneumatic tire, more particularly to a unidirectional tread pattern capable of improving wet performance and snowy road performance without sacrificing steering stability.

In order to improve wet performance and snowy road performance of a pneumatic tire having a block-type tread pattern, it has been proposed to increase the widths of tread grooves, aiming at increasing the drainage and self-ejecting snow in the tread grooves. In the technique to increase the widths of tread grooves, the ground contacting area decreases accordingly, therefore, the pattern rigidity decreases and the steering stability is deteriorated.

SUMMARY OF THE INVENTION

It is therefore, an object of the present invention to provide a pneumatic tire in which the wet performance and snowy road performance can be improved without sacrificing the steering stability.

According to the present invention, a pneumatic tire comprises a tread portion provided with a unidirectional tread pattern having an intended tire rotational direction, wherein the tread portion is provided on each side of the tire equator with a circumferential groove extending continuously in the tire circumferential direction and a plurality of main oblique grooves each extending form the tread edge to the circumferential groove, while inclining to the intended tire rotational direction and gradually decreasing its inclination angle with respect to the tire circumferential direction so as to form a row of circumferentially arranged shoulder blocks each axially delimited by the circumferential groove and circumferentially delimited by the main oblique grooves, the inclination angle of each of the main oblique grooves measured at the tread edge is in a range of from 60 to 120 degrees with respect to the tire circumferential direction, the width of each of the main oblique grooves is gradually increased toward the axially outside from the circumferential groove, the width of the circumferential groove is narrower at heel-side end positions of the shoulder blocks than at toe-side end positions of the shoulder blocks, and the shoulder blocks are provided with auxiliary oblique grooves each extending from one of the main oblique grooves toward the intended tire rotational direction and terminating at a distance of 2 to 7 mm from the next main oblique groove.

The pneumatic tire according to the present invention may be further provided with the following features:

the width of the circumferential groove at the toe-side end positions is 1.1 to 1.6 times the width of the circumferential groove at the heel-side end positions;

an edge of each of the shoulder blocks adjacent to the circumferential groove comprises a circumferential segment extending parallel with the tire circumferential direction from the heel-side end of the edge toward the toe-side end of the edge, and an oblique segment extending from the toe-side end of the circumferential segment to the toe-side end of the edge while inclining toward the axially outside;

the intersecting angle of the auxiliary oblique groove with the main oblique groove is in a range of from 55 to 85 degrees; and the width of the auxiliary oblique groove is gradually increased from its closed end toward its open end.

Therefore, utilizing rotation of the tire, the main oblique grooves can smoothly discharge water or snow entered therein toward the tread edges and the wet performance and snowy road performance can be improved. This is furthered by the width of the main oblique grooves gradually increasing toward the axially outside from the circumferential groove. As the angle of the main oblique grooves at the tread edges is specifically limited not to decrease the lateral stiffness (rigidity) of the tread portion near the tread edges, the wet performance and snowy road performance can be improved, and steering stability can be provided. Further, the auxiliary oblique grooves can gather water existing between the shoulder block and road surface and lead it to the main oblique grooves effectively by utilizing rotation of the tire. Furthermore, as the heel-side ends of the auxiliary oblique groove are closed, the leading of the water toward the main oblique grooves can be enhanced, and the decrease in the lateral stiffness of the shoulder block can be limited, therefore, the steering stability and wet performance can be improved in a well balanced manner. As the width of the circumferential groove is periodically decreased at the heel-side end positions of the shoulder blocks, water in the circumferential groove can be led into the main oblique grooves by utilizing rotation of the tire and the wet performance can be improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch (camber angle=0) in the normally inflated loaded condition.

The tread width TW is the axial distance between the tread edges Te measured in the normally inflated unloaded condition of the tire.

DESCRIPTION OF EMBODIMENTS

Figure 1:
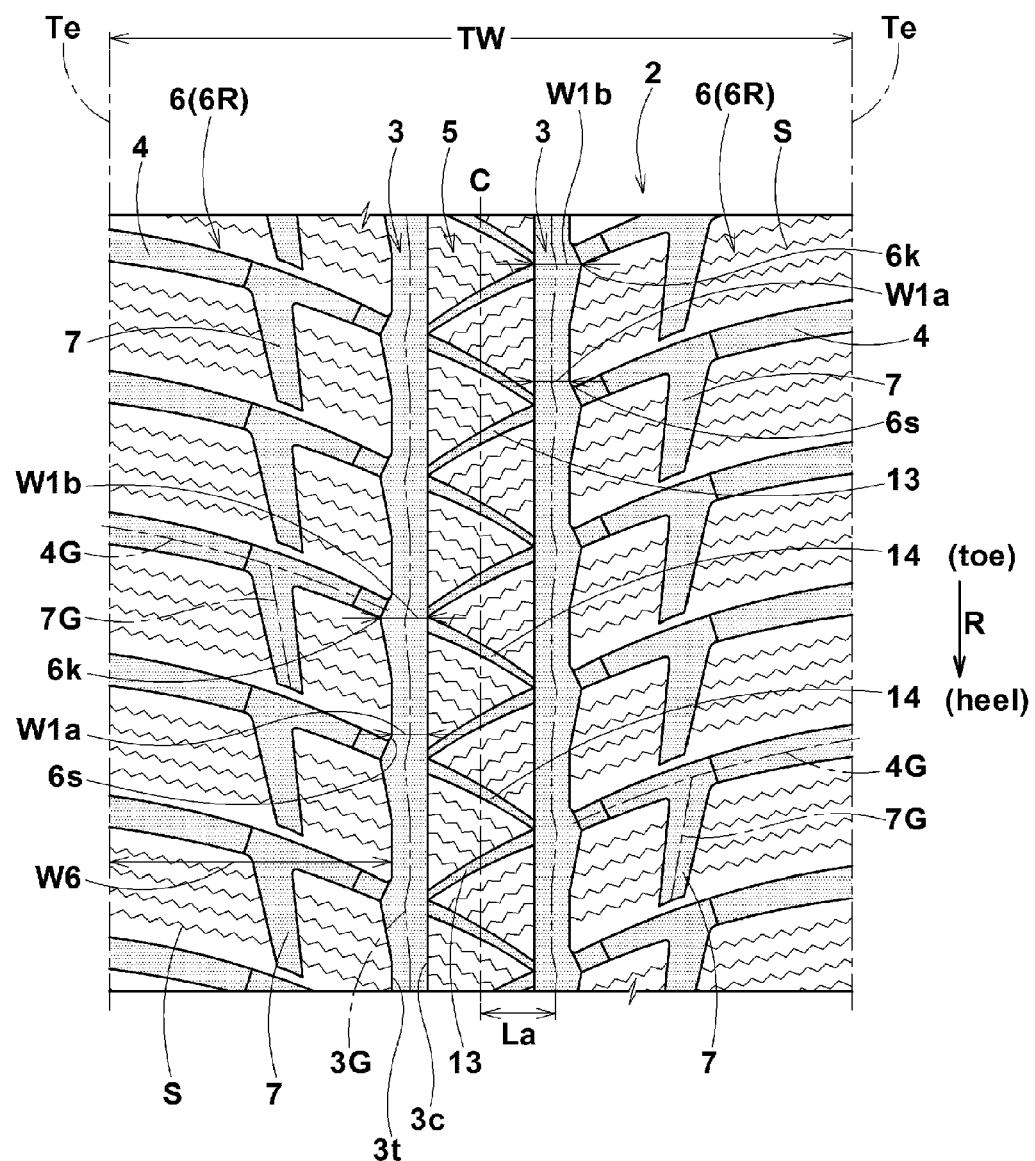
FIG. 1 is a developed partial view of the tread portion of a pneumatic tire according to the present invention.

Embodiments of the present invention will now be described in detail in conjunction with the accompanying drawings.

The present invention can be suitably applied to a studless tire. In the drawings, pneumatic tire according to the present invention is a studless radial tire for passenger cars. The tire has a unidirectional tread pattern having an intended tire rotation direction R. As usual, the intended tire rotation direction R is indicated in the tire sidewall portion (not shown).

In this embodiment, as shown in FIG. 1, one half of the unidirectional tread pattern on one side of the tire equator C is circumferentially shifted from one half on the other side of the tire equator C otherwise the pattern is substantially symmetric about the tire equator C.

The tread portion 2 is provided on each side of the tire equator C with a circumferential groove 3 extending continuously in the tire circumferential direction to axially divide the tread portion 2 into a central zone 5 between the two circumferential grooves 3, and a pair of shoulder zones each between the circumferential groove 3 and a tread edge Te. Each of the shoulder zones is provided with a plurality of main oblique grooves 4 extending from the circumferential groove 3 to the tread edge Te to circumferentially divide the shoulder zone into a row 6R of circumferentially arraigned shoulder blocks 6.

As a characteristic of a studless tire, a large number of sipes S are disposed in the entire area of the tread portion 2 including the central zone 5 and the shoulder blocks 6. The sipes S in this embodiment are zigzag sipes. Overall each sipe inclines with respect to the tire axial direction and circumferential direction.

The axially inner edge 3c of the circumferential groove 3 is formed as a straight edge parallel with the tire circumferential direction in order to smoothen water flow in the circumferential groove 3 and to maintain the rigidity of the central zone 5 and thereby to improve the wet performance and steering stability in a well balanced manner.

The axially outer edge 3t of the circumferential groove 3 is formed as a zigzag edge in order to improve the snowy road performance. The widthwise center line 3G of the circumferential groove 3 is accordingly zigzag.

In this application, the width of a groove is measured perpendicularly to the widthwise center line of the groove unless otherwise noted.

The width of the circumferential groove 3 is varied in the tire circumferential direction such that the width W1a measured at the heel-side end positions 6s of the shoulder blocks 6 is less than the width W1b measured at the toe-side end positions 6k of the shoulder blocks 6.

Preferably, the width W1b is set in a range of not less than 1.1 times, more preferably not less than 1.2 times, but not more than 1.6 times, more preferably not more than 1.5 times the width W1a.

Therefore, by utilizing rotation of the tire, water in the circumferential groove 3 is led to the main oblique grooves 4 to be discharged from the tread edges.

To enhance this effect, the width W1b is preferably 4 to 7% of the tread width TW.

As to the position of the circumferential groove 3, the axial distance La between the tire equator C and the widthwise center line 3G of the circumferential groove 3 is set in a range of not less than 6%, preferably not less than 8%, but not more than 14%, preferably not more than 12% of the tread width TW in order to optimize the rigidity balance between the central zone and shoulder zone for the steering stability.

In order to smoothly lead the water or snow in the main oblique grooves 4 toward the tread edges by utilizing rotation of the tire and thereby to improve the wet performance and snowy road performance, the main oblique grooves 4 are each curved in an arc which is convex toward the opposite direction to the intended tire rotational direction R so that the angle θ1 of the widthwise center line of the main oblique groove 4 with respect to the tire circumferential direction is gradually increased from the circumferential groove 3 to the tread edge.

The angle θ1 is set in a range of not less than 40 degrees, preferably not less than 50 degrees, but not more than 140 degrees, preferably not more than 130 degrees.

Further, at the tread edge Te, the angle θ1 (or θ1t) is preferably set in a range of not less than 60 degrees, more preferably not less than 70 degrees, still more preferably not less than 80 degrees, but not more than 120 degrees, more preferably not more than 110 degrees, still more preferably not more than 100 degrees not to decrease the lateral stiffness (rigidity) of the tread portion near the tread edges Te subjected to a relatively large ground pressure during cornering.

The width W2 of the main oblique grooves 4 is gradually increased from the circumferential groove 3 toward the axially outside.

In order to ensure the drainage of water or snow in the main oblique grooves 4 toward the tread edge, the width W2t of the main oblique groove 4 at the tread edge Te is preferably set in a range of not less than 1.1 times, more preferably not less than 1.2 times, but not more than 2.0 times, more preferably not more than 1.8 times the width W2c of the main oblique groove 4 at the intersecting point K of the main oblique grooves 4 with the circumferential groove 3.

If the width W2t is more than 2.0 times the width W2c, there is a possibility that the rigidity of the shoulder block 6 decreases and the steering stability is deteriorated.

The width W2 is preferably set in a range of not less than 3.5 mm, more preferably not less than 4.0 mm, but not more than 6.0 mm, more preferably not more than 5.5 mm.

Figure 2:
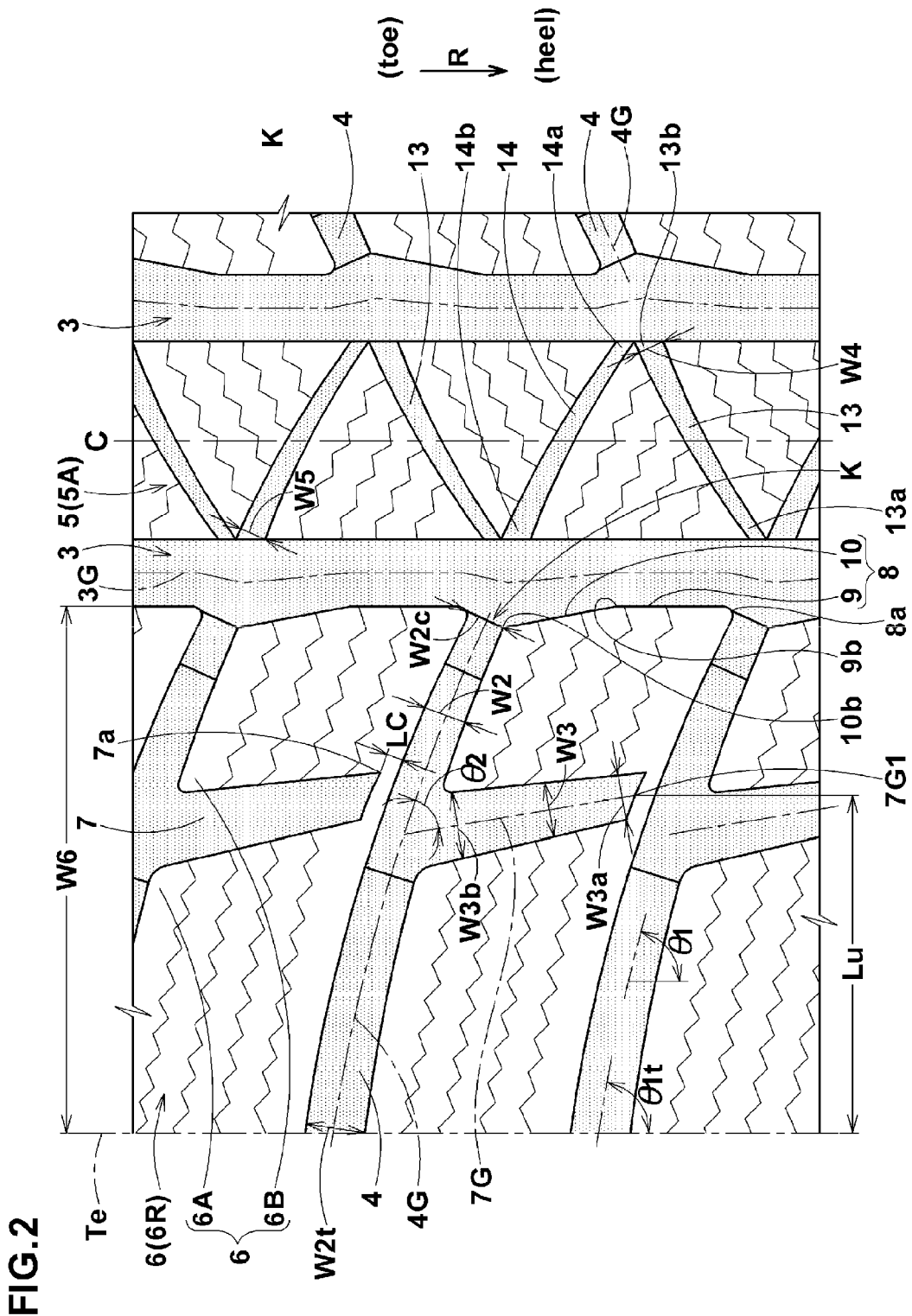
FIG. 2 is a closeup of a central part of FIG. 1.

The axially inner edge 8 of the shoulder block 6 abutting on the circumferential groove 3 comprises an oblique segment 10 which extends from the toe-side end 10b of the edge 8 toward the heel-side end 8a of the edge 8 while inclining to the axially inside, and a circumferential segment 9 which extends parallel with the tire circumferential direction from the heel-side end 9b of the oblique segment 10 toward the heel-side end 8a of the edge 8 (in this example, to the heel-side end 8a as shown in FIG. 2). Therefore, the water in the circumferential groove 3 is smoothly led to the main oblique grooves 4 as the tire rotates in the intended rotational direction R.

The shoulder blocks 6 are each provided with an auxiliary oblique groove 7 in order to gather water existing between the shoulder blocks 6 and road surface and lead it to the main oblique grooves 4 by utilizing rotation of the tire.

The auxiliary oblique groove 7 extends from the main oblique groove 4 on the toe side of the block toward the intended tire rotational direction R and terminates without reaching to the main oblique groove 4 on the heel side of the block in order to limit the direction of the water flow to the opposite direction to the tire rotational direction R and thereby to enhance the drainage.

The distance LC of the terminal end of the auxiliary oblique groove 7 from the main oblique groove 4 on the heel side is set to be not more than 7 mm, preferably not more than 6 mm in order to effectively gather the water.

However, the distance LC is set to be not less than 2 mm, preferably not less than 3 mm in order to prevent an excessive decrease in the rigidity of a part between the end 7a and the main oblique groove 4 and to prevent this part from being broken during use.

Thus, the shoulder block 6 has an outside block part 6A on the tread edge Te side of the auxiliary oblique groove 7 and an inside block part 6B on the tire equator C side of the auxiliary oblique groove 7.

The intersecting angle θ2 of the auxiliary oblique groove 7 with the main oblique groove 4 is preferably set to be not more than 85 degrees, more preferably not more than 80 degrees in order to smoothen the drainage from the auxiliary oblique groove 7 to the main oblique groove 4.

However, the intersecting angle θ2 is preferably set to be not less than 55 degrees, more preferably not less than 60 degrees not to decrease the rigidity of the inside block part 6B between the auxiliary oblique groove 7 and the main oblique groove 4 and thereby to prevent deterioration of the steering stability.

It is preferable that the auxiliary oblique groove 7 is inclined to the tread edge Te from its closed end 7a toward its open end connected to the main oblique groove 4 in order to enhance the drainage from the auxiliary oblique groove 7 to the main oblique groove 4 and not to decrease the rigidity of the inside block part 6B by preventing the width of the inside block part 6B from decreasing.

It is preferable that the width W3 of the auxiliary oblique groove 7 is gradually increased from its heel-side end toward its toe-side end to assure the rigidity of the shoulder block 6 and the limitation of the direction of the water flow to the counter tire rational direction.

The ratio W3b/W3a of the width W3b at the toe-side end to the width W3a at the heel-side end is preferably set in a range of not less than 1.2, more preferably not less than 1.3, but not more than 1.7, more preferably not more than 1.6.

The width W3 is preferably in a range of not less than 3.5 mm, more preferably not less than 4.0 mm, but not more than 7.5 mm, more preferably not more than 7.0 mm.

The distance Lu from the tread edge Te to the heel-side end 7G1 of the widthwise center line 7G of the auxiliary oblique groove 7 is preferably set in a range of from 50 to 80% of the axial maximum width W6 of the shoulder block 6 in order to provide rigidity for the outside block part 6A subjected to a relatively large lateral force during cornering and at the same time to surely discharge water existing between the road surface and the inside block part 6B subjected to a relatively large ground pressure during straight running.

To ensure these effects it is preferred that the depth of the circumferential groove 3 is 7.0 to 8.5 mm and the depth of the main oblique grooves 4 is 3.6 to 8.0 mm. And the depth of the auxiliary oblique groove 7 is not less than 80%, preferably not less than 90%, but not more than 120%, preferably not more than 110% of the depth of the main oblique groove 4.

In the central zone 5, first and second center oblique grooves 13 and 14 are alternately arranged in the tire circumferential direction to extend from one of the circumferential grooves 3 to the other while inclining with respect to the tire axial direction to one circumferential direction and the other circumferential direction alternately. For example in FIG. 2, the first center oblique grooves 13 extend from bottom left to top right, and the second center oblique grooves 14 extend from top left to bottom right.

The toe-side end 14b of the second center oblique groove 14 and the heel-side end 13a of the first center oblique groove 13 are disposed adjacently to each other and opened to the leftward circumferential groove 3.

The toe-side end 13b of the first center oblique groove 13 and the heel-side end 14a of the second center oblique groove 14 are disposed adjacently to each other and opened to the rightward circumferential groove 3.

Therefore, the central zone 5 is divided into a row 5A of circumferentially arranged triangular blocks.

In this embodiment, the widths of the first and second center oblique grooves 13 and 14 are gradually increased from the heel-side ends 13a and 14a to toe-side ends 13b and 14b. The toe-side ends 13b and 14b (open ends) of the first and second center oblique grooves 13 and 14 are respectively positioned on extensions of the widthwise center lines 4G of the main oblique grooves 4 in order that water existing between the central zone 5 and road surface is effectively led into the main oblique grooves 4 from the center oblique grooves 13 and 14 and thereby to improve the wet performance.

To enhance this effect, the widths W4 and W5 of the first and second center oblique grooves 13 and 14 at the toe-side ends 13b and 14b are preferably set to be not less than 55%, more preferably not less than 65% of the width W2c of the main oblique groove 4. However, the widths W4 and W5 are preferably not more than 95%, more preferably not more than 85% of the width W2c in order to prevent the rigidity of the central zone 5 from becoming insufficient.

Figure 3:
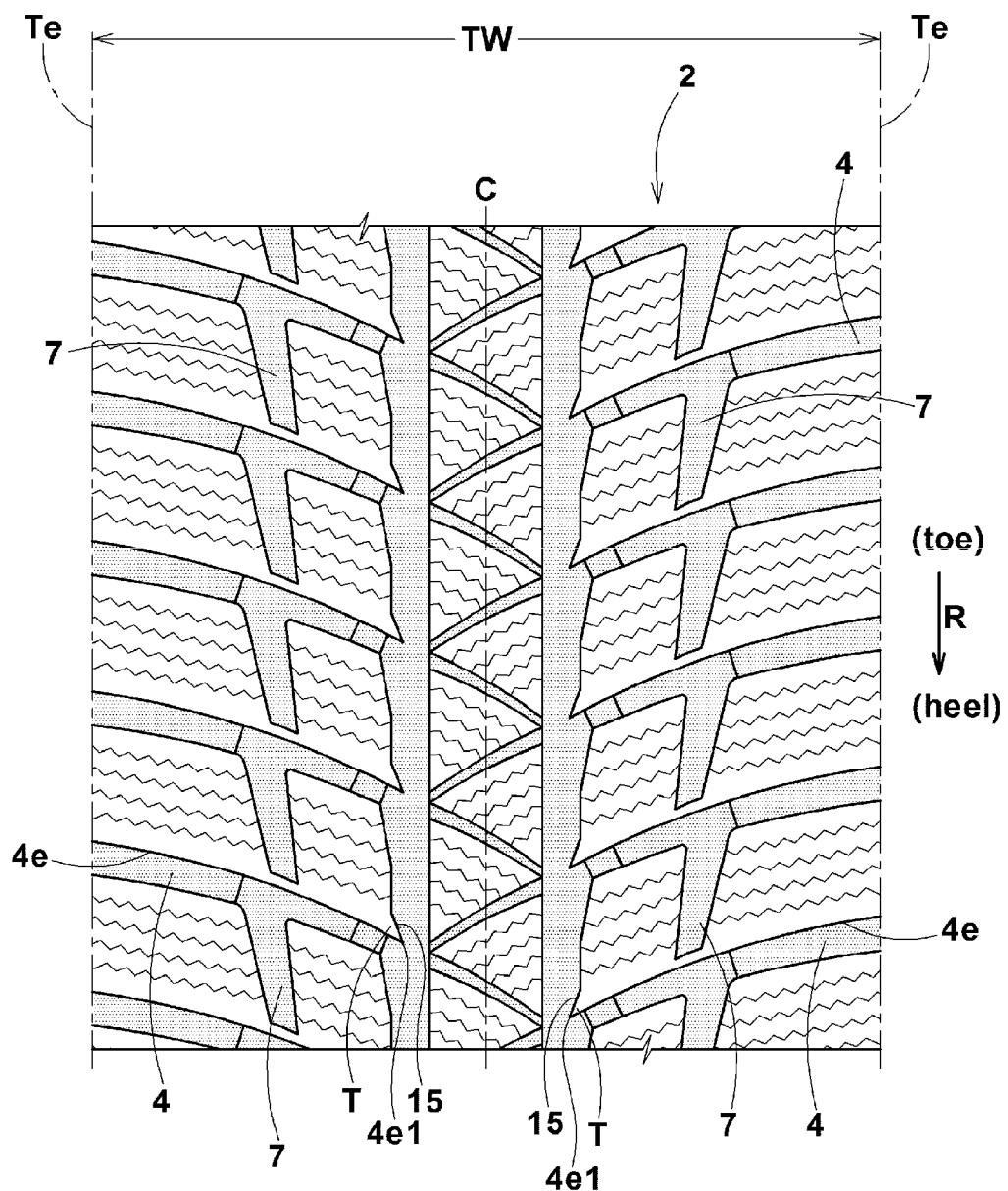
FIG. 3 is a developed partial view of the tread portion of a pneumatic tire according to the present invention.

FIG. 3 shows a modification of the above-mentioned pneumatic tire which is another embodiment of the present invention. In this embodiment, in order to effectively lead the water flow occurring in the circumferential groove 3 (water flow from the heel-side to the toe-side) to the main oblique grooves 4, a guiding protrusion T is formed at the heel-side end 8a of the axially inner edge 8 of each shoulder block 6. The protrusion T has a triangular shape. As a result, in comparison with the former embodiment, the heel-side edge 4e of the shoulder block 6 (or toe-side edge of the main oblique groove 4) extends more into the circumferential groove 3 and the axially inner edge 8 of the block 6 further includes an oblique segment 15 which connects between the axially inner end 4e1 of the edge 4e and the above-mentioned circumferential segment 9 while inclining with respect to the tire circumferential direction.

Comparison Tests

Based on the tread pattern shown in FIG. 1, pneumatic tires of size 195/65R15 (rim size 15×6 JJ) having specifications shown in Table 1 were prepared and tested.

Common specifications are as follows.

tread width TW: 178 mm
    <Circumferential Groove>
        width W1a: 4.5% of TW
        depth: 8.5 mm
        position La: 9 to 11% of TW
    <Main Oblique Grooves>
        width W2c: 2.8% of TW
        depth: 4.5 to 8.5 mm
    <Auxiliary Oblique Grooves>
        width W3a: 3.1% of TW
        depth: 8.5 mm
        position Lu: 70% of width W6
    <First and Second Center Oblique Grooves>
        widths W4 and W5: 70% W2c
        depth: 3.5 mm
    <Sipes>
        width: 0.8 to 1.0 mm
        depth: 2.3 to 7.0 mm <Snowy Road Performance and Steering Stability on Dry Road>

Test tires were attached to a 2000 cc rear-wheel-drive car and run on a snowy road and dry asphalt road in a tire test course. The test driver evaluated the snowy road performance and steering stability on dry road based on the steering response, rigid feeling, grip and the like. (Tire pressure: 200 kPa) The results are indicated in Table 1 by an index based on Comparative example tire Ref.1 being 100, wherein the larger value is better.

<Wet Performance (Lateral Aquaplaning) Test>

The above-mentioned test car was run along a 100 meter radius circle on a wet asphalt road provided with a 10 mm depth 20 m long water pool, and the lateral acceleration (lateral G) during running in the water pool was measured at the front wheels, gradually increasing the speed entering into the water pool, to obtain the average for the speed range of from 55 to 80 km/h. The results are indicated in Table 1 by an index based on comparative example tire Ref.1 being 100, wherein the larger value is better.

From the test results, it was confirmed that Embodiment tires can be improved in the various performances when compared with comparative example tires.

TABLE 1

| Tire | Ref. 1 | Ex. 1 | Ex. 2 | Ex. 3 | Ref. 2 | Ref. 3 | Ex. 4 | Ex. 5 |
|---|---|---|---|---|---|---|---|---|
| tread pattern (FIG. No.) | 1 | 1 | 1 | 1 | 1 | 1 | 1 | 1 |
| angle θ1t (deg.) at tread edge | 55 | 90 | 60 | 80 | 90 | 90 | 90 | 90 |
| distance Lc (mm) | 3.5 | 3.5 | 3.5 | 3.5 | 0 | 1 | 2 | 6 |
| width ratio W1b/W1a | 1.4 | 1.4 | 1.4 | 1.4 | 1.4 | 1.4 | 1.4 | 1.4 |
| intersecting angle θ2 (deg.) | 70 | 70 | 70 | 70 | 70 | 70 | 70 | 70 |
| width ratio W3b/W3a | 1.4 | 1.4 | 1.4 | 1.4 | 1.4 | 1.4 | 1.4 | 1.4 |
| snowy road performance | 100 | 110 | 105 | 110 | 104 | 103 | 112 | 108 |
| wet performance | 100 | 110 | 105 | 110 | 101 | 104 | 110 | 108 |
| steering stability | 100 | 120 | 110 | 114 | 96 | 97 | 104 | 122 |

| Tire | Ex. 6 | Ref. 4 | Ref. 5 | Ref. 6 | Ex. 7 | Ex. 8 | Ex. 9 | Ex. 10 |
|---|---|---|---|---|---|---|---|---|
| tread pattern (FIG. No.) | 1 | 1 | 1 | 1 | 1 | 1 | 1 | 1 |
| angle θ1t (deg.) at tread edge | 90 | 90 | 90 | 90 | 90 | 90 | 90 | 90 |
| distance Lc (mm) | 7 | 8 | 3.5 | 3.5 | 3.5 | 3.5 | 3.5 | 3.5 |
| width ratio W1b/W1a | 1.4 | 1.4 | 0.9 | 1.0 | 1.1 | 1.6 | 1.7 | 1.4 |
| intersecting angle θ2 (deg.) | 70 | 70 | 70 | 70 | 70 | 70 | 70 | 50 |
| width ratio W3b/W3a | 1.4 | 1.4 | 1.4 | 1.4 | 1.4 | 1.4 | 1.4 | 1.4 |
| snowy road performance | 106 | 100 | 99 | 101 | 107 | 110 | 110 | 110 |
| wet performance | 106 | 96 | 96 | 98 | 108 | 111 | 112 | 112 |
| steering stability | 122 | 122 | 120 | 120 | 120 | 110 | 106 | 116 |

| Tire | Ex. 11 | Ex. 12 | Ex. 13 | Ex. 14 | Ex. 15 | Ex. 16 | Ex. 17 | Ex. 18 |
|---|---|---|---|---|---|---|---|---|
| tread pattern (FIG. No.) | 1 | 1 | 1 | 1 | 1 | 1 | 1 | 3 |
| angle θ1t (deg.) at tread edge | 90 | 90 | 90 | 90 | 90 | 90 | 90 | 90 |
| distance Lc (mm) | 3.5 | 3.5 | 3.5 | 3.5 | 3.5 | 3.5 | 3.5 | 3.5 |
| width ratio W1b/W1a | 1.4 | 1.4 | 1.4 | 1.4 | 1.4 | 1.4 | 1.4 | 1.4 |
| intersecting angle θ2 (deg.) | 55 | 85 | 88 | 70 | 70 | 70 | 70 | 70 |
| width ratio W3b/W3a | 1.4 | 1.4 | 1.4 | 1.1 | 1.2 | 1.7 | 1.8 | 1.4 |
| snowy road performance | 110 | 108 | 106 | 108 | 110 | 110 | 110 | 111 |
| wet performance | 110 | 106 | 104 | 104 | 108 | 111 | 110 | 114 |
| steering stability | 117 | 120 | 120 | 118 | 120 | 116 | 115 | 118 |

The invention claimed is:

1. A pneumatic tire comprising
a tread portion provided with a unidirectional tread pattern having an intended tire rotational direction, wherein
said tread portion is provided on each side of the tire equator with: a circumferential groove extending continuously in the tire circumferential direction; and a plurality of main oblique grooves each extending from the tread edge to said circumferential groove, while inclining to the intended tire rotational direction and gradually decreasing its inclination angle with respect to the tire circumferential direction so as to form a row of circumferentially arranged shoulder blocks each axially delimited by the circumferential groove and circumferentially delimited by the main oblique grooves,
the inclination angle of each said main oblique groove measured at the tread edge is in a range of from 60 to 120 degrees with respect to the tire circumferential direction,
the width of each said main oblique groove is gradually increased toward the axially outside from the circumferential groove,
the width of the circumferential groove is narrower at heel-side end positions of the shoulder blocks than at toe-side end positions of the shoulder blocks, and
said shoulder blocks are provided with auxiliary oblique grooves each extending from one of said main oblique grooves toward the intended tire rotational direction and terminating at a distance of 2 to 7 mm from the next main oblique groove,
wherein a central zone defined between the circumferential grooves on both sides of the tire equator is provided with first center oblique grooves and second center oblique grooves which are alternately arranged in the tire circumferential direction,
the first center oblique grooves and the second center oblique grooves extend from one of the circumferential grooves to the other, while inclining with respect to the tire axial direction to one circumferential direction and the other circumferential direction alternately,
toe-side open ends of the first and second center oblique grooves are respectively positioned on extensions of the widthwise center lines of the main oblique grooves on both sides of the tire equator, and said toe-side open ends are disposed adjacently to respective heel-side open ends of the first and second center oblique grooves, and the central zone is divided into a single row of circumferentially arranged triangular blocks.

2. The pneumatic tire according to claim 1, wherein the width of the circumferential groove at the toe-side end positions of the shoulder blocks is 1.1 to 1.6 times the width of the circumferential groove at the heel-side end positions of the shoulder blocks.

3. The pneumatic tire according to claim 1 or 2, wherein an axially inner edge of each said shoulder block adjacent to the circumferential groove comprises a circumferential segment extending parallel with the tire circumferential direction toward the toe-side end of said axially inner edge, and an oblique segment extending from the toe-side end of the circumferential segment to the toe-side end of said axially inner edge, while inclining toward the axially outside.

4. The pneumatic tire according to claim 1, wherein the intersecting angle of the auxiliary oblique groove with the main oblique groove is in a range of from 55 to 85 degrees.

5. The pneumatic tire according to claim 1, wherein the width of the auxiliary oblique groove is gradually increased from its closed end toward its open end connected to said one of the main oblique grooves.

6. The pneumatic tire according to claim 1, wherein an axially inner edge of each said shoulder block adjacent to the circumferential groove comprises a circumferential segment extending parallel with the tire circumferential direction toward the toe-side end of said axially inner edge, and an oblique segment extending from the toe-side end of the circumferential segment to the toe-side end of said axially inner edge, while inclining toward the axially outside, and an edge of each said triangular block adjacent to the circumferential groove is substantially parallel with the tire circumferential direction.

7. The pneumatic tire according to claim 6, wherein each of said main oblique grooves is connected by only said auxiliary oblique groove, and the width of the auxiliary oblique groove is gradually increased from its closed end toward its open end connected to the main oblique groove.

8. The pneumatic tire according to claim 1, wherein each said main oblique groove is connected by only said auxiliary oblique groove, and the width of the auxiliary oblique groove is gradually increased from its closed end toward its open end connected to the main oblique groove.

9. The pneumatic tire according to claim 1, wherein the axially inner edge of the circumferential grooves are formed as a straight edge parallel with the tire circumferential direction and the axially outer edge of the circumferential grooves are formed as a zigzag edge.

10. The pneumatic tire according to claim 1, wherein the axial distance between the tire equator and the widthwise center line of the circumferential grooves is not less than 6% and not more than 14% of the tread width.

11. The pneumatic tire according to claim 1, wherein the width of the main oblique grooves at the tread edge is 1.1 to 2.0 times the width of the main oblique grooves at the intersecting point of the main oblique grooves with the circumferential grooves.

12. The pneumatic tire according to claim 1, wherein the widths of the first and second center oblique grooves are gradually increased from the heel-side ends to the toe-side ends.

13. The pneumatic tire according to claim 12, wherein a guiding protrusion is formed at the heel-side end of the axially inner edge of each shoulder block.

* * * * *